United States Patent

Takashima et al.

[11] 3,900,775
[45] Aug. 19, 1975

[54] METALLIZED FILM CAPACITOR

[75] Inventors: Kazushige Takashima, Kawanishi; Katumi Nishigaki, Ikeda; Terumasa Yamashita, Kobe, all of Japan

[73] Assignee: Matsushita Electric Industrial Co., Ltd., Osaka, Japan

[22] Filed: June 24, 1974

[21] Appl. No.: 482,585

[52] U.S. Cl. .............................. 317/258; 317/260
[51] Int. Cl. .......................................... H01g 3/175
[58] Field of Search ........................ 317/260, 258

[56] References Cited
UNITED STATES PATENTS
3,553,543  1/1971  Netherwood .................. 317/258

*Primary Examiner*—E. A. Goldberg
*Attorney, Agent, or Firm*—Stevens, Davis, Miller & Mosher

[57] ABSTRACT

A metallized film capacitor wherein a polyethylene terephthalate film both sides of which are metallized, and a polypropylene film having a thickness of 70 to 90% of that of said polyethylene terephthalate film are wound at the same time.

2 Claims, 4 Drawing Figures 3,900,775

METALLIZED FILM CAPACITOR

The present invention relates to a metallized film capacitor.

Generally, plastic films are inferior in heat resistance, so that they are subject to the influence of heat of an evaporated metal in a vacuum evaporation step of the film metallizing process and limited in evaporation yield by the thermal shrinkage of the films. At the present time, a metallized film of polypropylene having a comparatively low heat resistance (melting point of 160°C) among all the plastic films is fabricated, which film, however, has a low yield and requires a large number of manufacturing processes. The polypropylene film having a low heat resistance as described above is also disadvantageous in that it is readily subjected to the influence of heat generated when molten metal is sprayed on both end faces of an element for taking out a lead wire. This spraying is a common practice in manufacturing metallized film capacitors.

A polyethylene terephthalate film having a melting point of 260°C and accordingly a comparatively high heat resistance among a wide variety of plastic films has been metallized in the past and used in capacitors. The polyethylene terephthalate film has a high yield, as might be expected from its high heat resistance in comparison with the polypropylene film, and a small number of processes are enough for its manufacture.

However, capacitor characteristics, particularly the tan δ characteristic, of the polyethylene terephthalate film is not necessarily good, as is clear from curve A of FIG. 1 which will be discussed hereinafter. On the contrary, the polypropylene film has excellent in characteristics, particular the tan δ characteristic, as shown by curve B of FIG. 1, so that it has been recently employed widely as material for capacitors.

The polypropylene film, however, is inferior in heat resistance and accordingly influenced greatly by heat, as described above.

In manufacturing a capacitor employing such a polypropylene film, particularly a metallized one of comparatively low heat resistance, it is difficult to being out, a lead wire, because the end faces of the element are in contact with an electrode.

On the other hand, the spraying of molten metal, generally effected in metallized film capacitors, on both end faces of each capacitor element for leading out electrodes involve disadvantages. In the case of a capacitor utilizing a polypropylene film of low heat resistance, the film is readily molten or shrunk by the heat of the molten metal. Accordingly, the contact of the end faces of the elements with the electrodes is unsatisfactory, so that the capacitor is its tan δ characteristic or, in the worst case, it cannot function as a capacitor and yield is reduced.

An object of the present invention is to compensate for these disadvantages of the polypropylene film and to obtain higher reliability and more economical insulating design of a capacitor.

In accordance with the present invention there is provided a capacitor wherein a satisfactory insulating co-operation is accomplished economically, and which possesses industrially excellent effects.

In order that the invention may be better understood, the same will now be described with reference to the accompanying drawings, in which.

Figure 1:
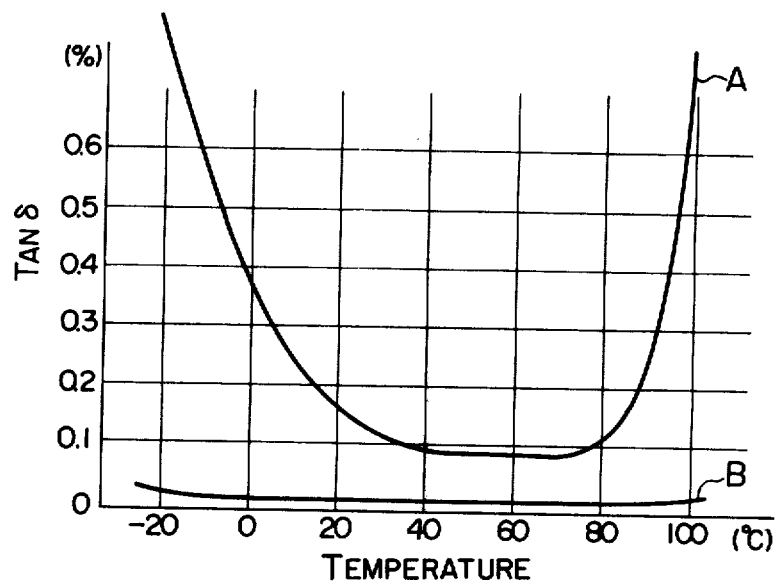
FIG. 1 is a graphical illustration of the tan δ-temperature characteristic of a polyethylene terephthalate and a polypropylene film.
Figure 2:
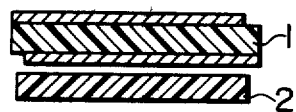
FIG. 2 is a sectional view of a capacitor according to the invention prior to winding its films.
Figure 3:
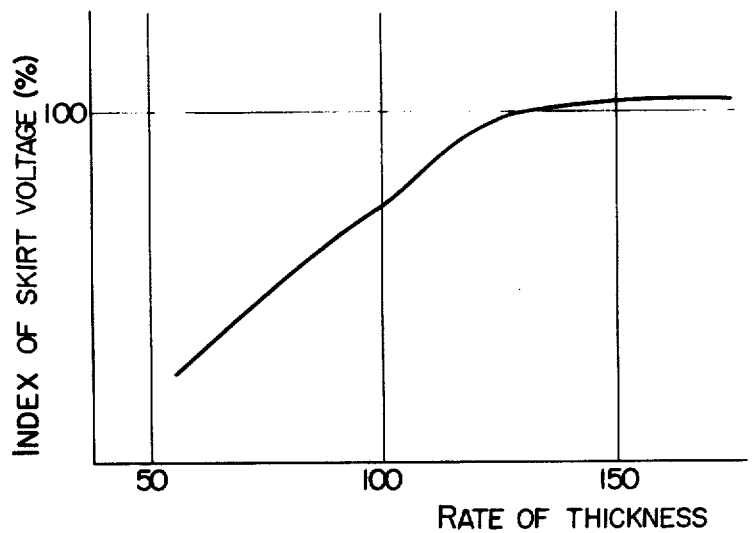
Figure 4:
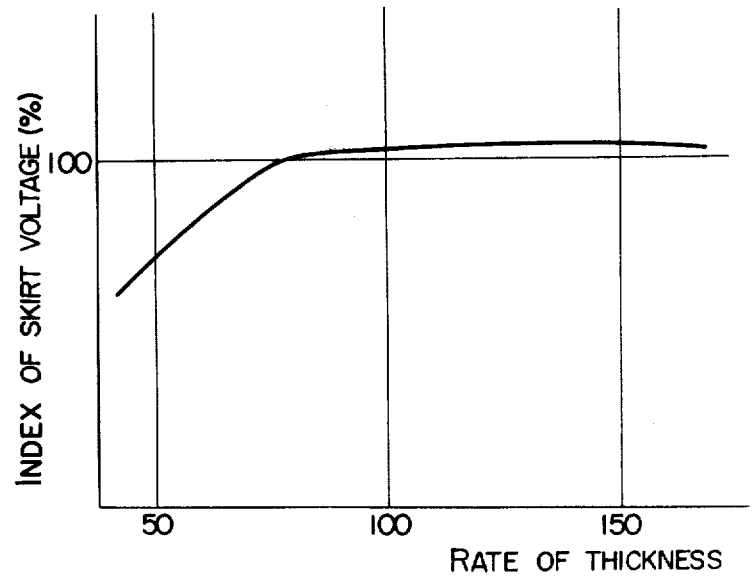

FIG. 3 is a graphical illustration of the relationship between the thickness of a polyethylene terephthalate film (as the abscissa) of the capacitor of FIG. 2, when the thickness of a polypropylene film is 100, and the index of the skirt voltage (as the ordinate) of a V - T characteristic divided by the thickness of the polypropylene film; and FIG. 4 is a graphical illustration of the relationship between the thickness of a polypropylene film (as the abscissa) of the capacitor of FIG. 2, when the thickness of a polyethylene terephthalate film is 100, and the index of the skirt voltage (as the ordinate) of a V - T characteristic divided by the thickness of the polyethylene terephthalate film.

Referring now to FIG. 2, the reference numeral 1 designates a polyethylene terephthalate film both sides of which are metallized, and the numeral 2 designates a polypropylene film the width of which is less than that of said polyethylene terephthalate film by 1 mm or more.

According to this embodiment of the capacitor, because the polyethylene film on which molten metal is sprayed to bring out an electrode has a high heat resistance, melting or shrinkage of the film scarcely occurs, so that a satisfactory contact of the electrode is obtained with comparative ease.

Thus, there is provided a capacitor which combines an excellent dielectric characteristic of the polypropylene film with a high heat resistance of the polyethylene terephthalate film, which is superior to prior art capacitors in characteristics, number of manufacturing processes and yield.

The inventors have discovered, as a result of making a further study of the construction of the capacitor described above, that the films differ in dielectric strength, and have found a suitable thickness combination of the films for accomplishing a desired insulating co-operation thereof.

In other words, the investigation of the relationship between breakdown voltage and time up to breakdown, that is the, V - T characteristic, of capacitors utilizing a polyethylene terephthalate and a polypropylene film, showed that the voltage at which no breakdown occurs for a long time, that is the, V - T skirt voltage is 42 V/$\mu$ for the polyethylene terephthalate film, while it is 76 V/$\mu$ for the polypropylene film.

As shown in FIG. 3, when the thickness of the polypropylene film is kept constant and that of the polyethylene terephthalate film is altered, in the capacitor of the construction illustrated in FIG. 2, the index of the skirt voltage of the V - T characteristic divided by the thickness of the polypropylene film rises with the increased thickness of the polyethylene terephthalate film, assumes a slowly upward curve in the vicinity of a point where the thickness of the polyethylene terephthalate film is about 120 % of that of the polypropylene film, and turns approximately constant nearly at a point where the thickness of the former film is about 140 % of that of the latter. Further as shown in FIG. 4, when the thickness of the polyethylene terephthalate film is similarly fixed and that of the polypropylene film is changed, the index of the skirt voltage of the V - T characteristic divided by the thickness of the polyethylene film rises with the increased thickness of the polypropylene film, shifts into a slowly upward change at a point where the thickness of the polypropylene film is ca. 70 % of that of the polyethylene terephthalate film, and becomes nearly constant at a point where the former is ca. 90 % of the latter. A directly proportional linear portion of the curve of FIG. 3 is ascribable to the breakdown of the polyethylene terephthalate film, and an approximately constant portion to that of the polypropylene film.

On the contrary, a proportional linear portion of FIG. 4 results assumably from the breakdown of the polypropylene film and a constant portion from that of the polyethylene terephthalate.

On the ground of these results there is proposed a combination of polyethylene terephthalate and polypropylene films in a rate of thickness which lies in an area where the linear portion changes into the constant portion, because in this area the insulating cooperation of both films is best.

In the ratio of the V - T skirt voltage of the polyethylene terephthalate and the polypropylene film described above, the thickness of the polypropylene film is 55 % of that of the polyethylene terephthalate film which is 100, but FIG. 4 shows that said thickness is more than 55 %. This occurs because the capacitor is loaded thermally by heat resulting from the tan δ of the polyethylene terephthalate film and the breakdown voltage of the polypropylene film is reduced.

Thus, a capacitor of the construction illustrated in FIG. 2, in which the thickness of the polypropylene film is 70 to 90, and that of the polyethylene terephthalate is 100 is most desirable for optimizing insulation cooperation, economy and industrial effectiveness.

What we claim is:

1. A metallized film capacitor comprising a polyethylene terephthalate film both sides of which are metallized, and a non-metallized polypropylene film, both said films being wound at the same time, the thickness of said polypropylene film being 70 to 90% of that of said polyethylene terephthalate film.

2. A metallized film capacitor as claimed in claim 1, wherein the width of said polypropylene film is at least 1 mm less than that of said polyethylene terephthalate film.

* * * * *